(No Model.) 2 Sheets—Sheet 1.
G. T. WINTERS.
FEED TROUGH.
No. 559,114. Patented Apr. 28, 1896.
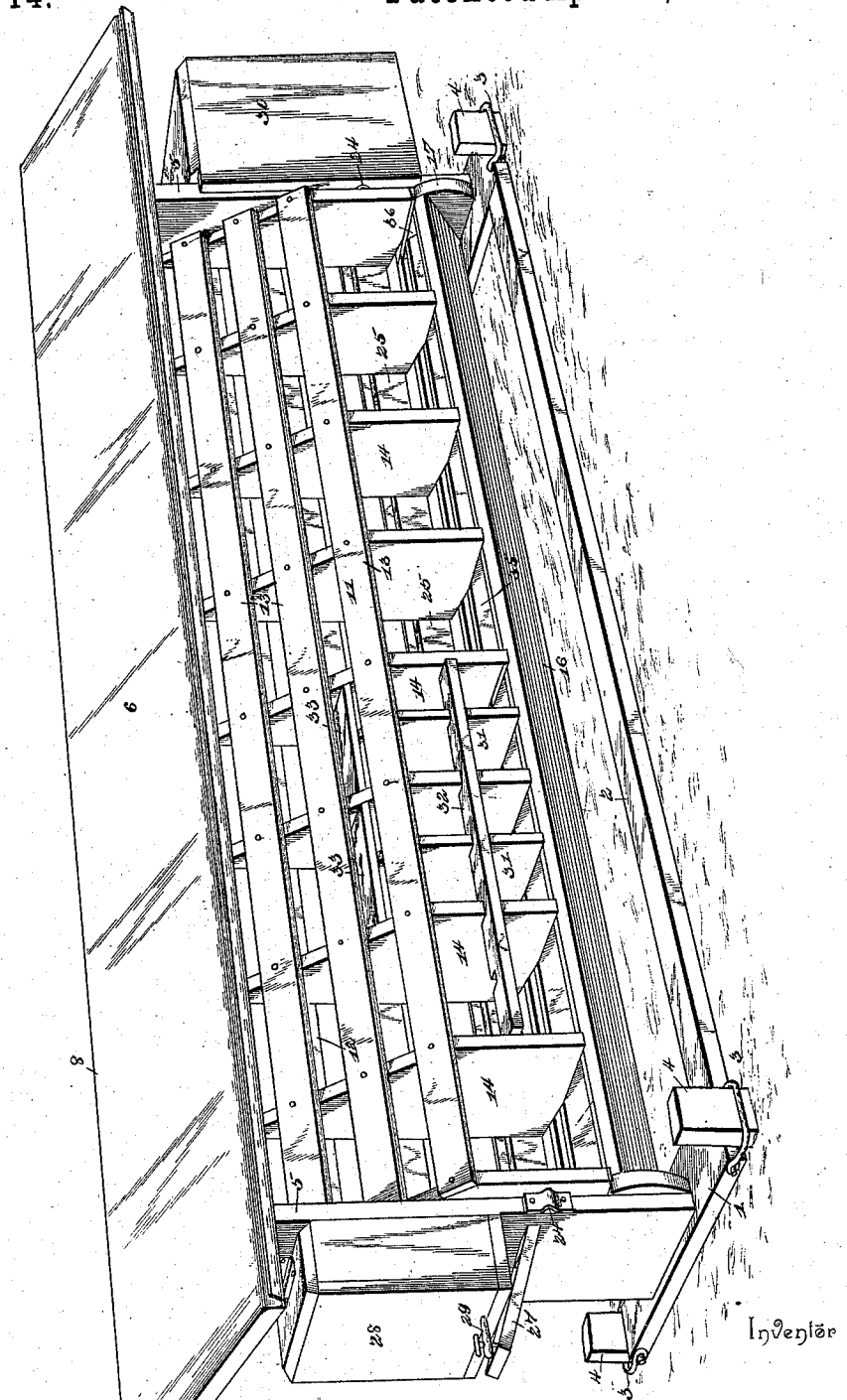
Witnesses
By his Attorneys. George T Winters.

(No Model.) 2 Sheets—Sheet 2.
G. T. WINTERS.
FEED TROUGH.
No. 559,114. Patented Apr. 28, 1896.
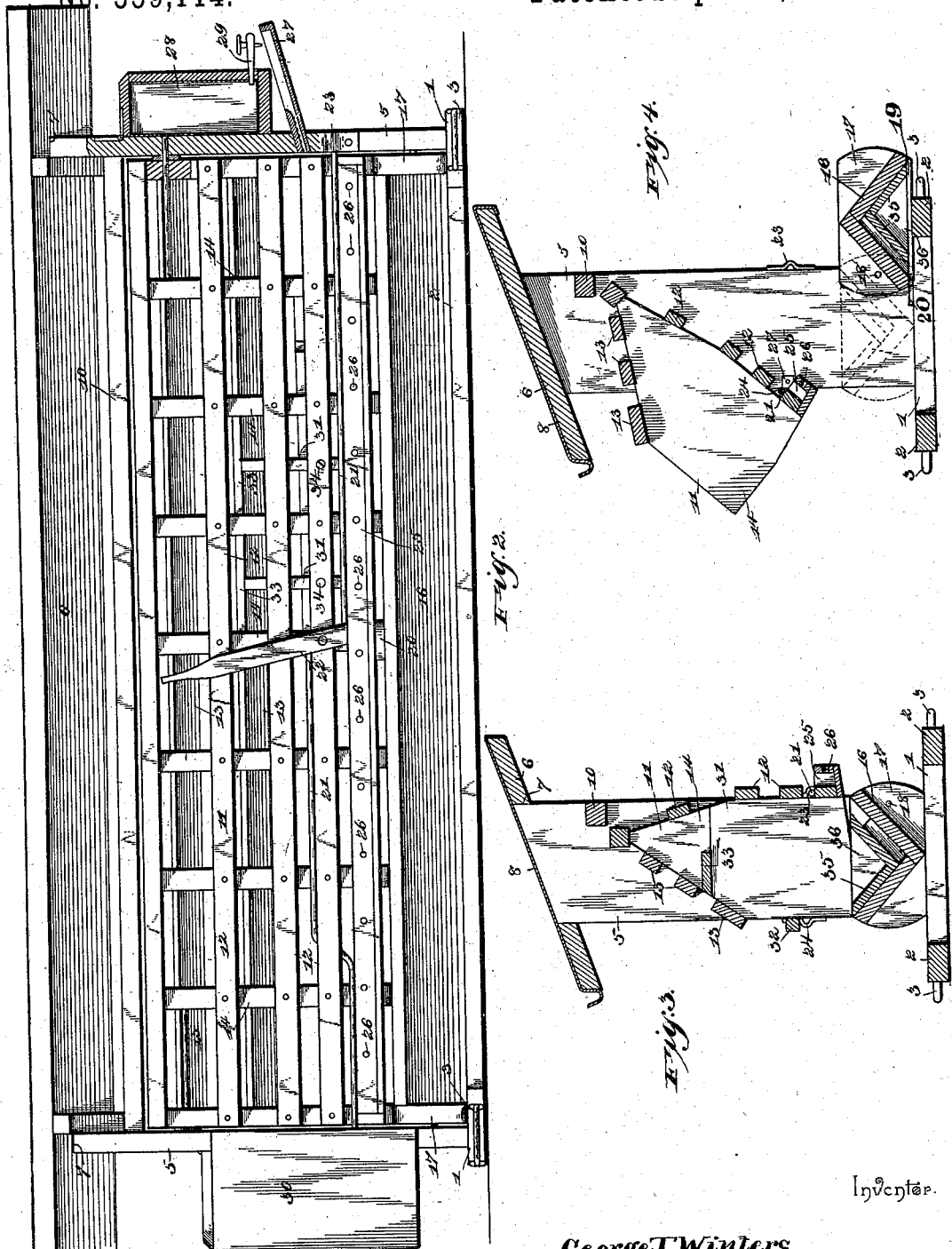
Witnesses
Inventor.
George T Winters
By his Attorneys.

UNITED STATES PATENT OFFICE.

GEORGE T. WINTERS, OF CAMERON, WEST VIRGINIA.

FEED-TROUGH.

SPECIFICATION forming part of Letters Patent No. 559,114, dated April 28, 1896.

Application filed January 28, 1895. Serial No. 536,479. (No model.)

*To all whom it may concern:*

Be it known that I, GEORGE T. WINTERS, a citizen of the United States, residing at Cameron, in the county of Marshall and State of West Virginia, have invented a new and useful Feed-Trough, of which the following is a specification.

My invention relates to feed-troughs designed for use in feeding stock, particularly hogs; and the objects in view are to provide a simple and efficient feed-trough which may be manufactured at a small cost; to provide means whereby temporary partitions may be arranged in the stalls of the trough to divide such stalls to accommodate shoats; to provide means for tipping or reversing the trough in order to facilitate the cleaning thereof; to provide an auxiliary trough of smaller cross-sectional area than the main trough to adapt the device for feeding shoats; to provide means for swinging the rack which forms the stalls in such a position as to serve as a guard to prevent stock from approaching the trough while cleaning the latter or while preparing the feed, and, furthermore, to provide a water-distributing device, in connection with the swinging rack, whereby water for mixing feed may be distributed throughout the trough to provide for placing the feed in the trough in a dry state and subsequently moistening the same.

Further objects and advantages of the invention will appear in the following description, and the novel features thereof will be particularly pointed out in the appended claims.

In the drawings, Figure 1 is a perspective view of a feed-trough constructed in accordance with my invention, viewing the same from the front. Fig. 2 is a rear view. Fig. 3 is a transverse section. Fig. 4 is a similar view showing the rack swung outward to form a guard and the trough shown in full lines in its reversed position and in dotted lines in its normal position.

Similar numerals of reference indicate corresponding parts in all the figures of the drawings.

The base of the structure comprises the end sills 1, connected by the longitudinal bars 2, said end sills being provided with terminal pivotal loops 3 to engage stakes 4, by which the device is secured in position. Rising from the end sills are end standards 5, having forwardly and downwardly beveled upper ends upon which rests the cover 6, said cover being provided with slots 7 to receive the upper ends of the standards, and being provided with a metallic sheath or cover 8, which is doubled upon itself at its lower edge to form an eaves-trough.

Connecting the standards near their upper ends is a longitudinal strip 10, and below the plane of this strip and between the standards is arranged a pivotal rack 11, comprising a series of rear longitudinal strips 12, front longitudinal strips 13, and spaced partitions 14, forming intermediate stalls. The upper portions of the partitions are tapered at their front edges, and to these tapered edges are secured the front longitudinal bars 13, the rear strips 12 being secured to the rear vertical edges of the partitions, and being therefore arranged in an approximately vertical plane. The terminal partitions of the rack are pivotally connected by means of rods 15 to the end standards, whereby the rack may be swung from its vertical position (shown in Figs. 1 and 2) to the inclined position to expose the trough 16, which is arranged between the standards below the plane of the lower side of the rack. This trough is provided with end pieces 17, which are connected by pivot-bolts 18 to the standards, the contiguous ends of said end pieces 17 being rounded to provide for reversing the trough to discharge its contents and facilitate cleansing. Secured to the center of the trough is a foot-lever 19, which projects beyond the rear side of the trough to form a foot-rest 20, whereby the operator may turn the trough from its operative or normal position to the inverted or reversed position (shown in Fig. 4) by the pressure of his foot.

In order to provide for securing the rack in either its operative or displaced position, I employ locking-rods 21, connected at their inner ends to a hand-lever 22 and arranged at their outer ends to engage sockets 23 and 24, the former of which is arranged at the rear edges of the standards and the latter at the front edges of the same. Arranged at the lower edge of the rack upon its rear side is a distributing-trough 25, provided throughout its length with spaced outlet-perforations 26 and adapted when the rack is in its inclined position and the feed-trough is exposed to receive water from a chute 27, which is supported by one of the end standards. Secured to the outer side of said standard above the outer end of said chute is a tank 28, adapted to contain water, and provided with a faucet 29 to discharge the same into the chute, whereby it is conducted to the distributing-trough. Supported by the other end standard is a feed-box 30.

The advantage of the above-described construction, in so far as it relates to the swinging movement of the rack, the distributing-trough, and the means for supplying the same with water, is that when it is desired to prepare feed for the stock the rack is swung to its inclined position, in which the lowermost or longitudinal strip on its rear side is arranged at the front edge of the feed-trough and thus forms a guard to prevent the stock from reaching the trough during the preparation of the feed. The feed is preferably placed in the trough in a dry state, for the reason that it may be more readily and uniformly distributed, after which water is admitted to the distributing-trough from the tank and is carried by said trough to all parts of the feed-trough. This prevents the flooding of one portion of the feed-trough and the washing of the feed toward one end thereof, and also obviates the necessity of mixing the feed. The only requirement is to moisten the same sufficiently to prevent the stock in breathing from blowing away and thus wasting the grain.

When it is desired to feed shoats or small stock and the stalls which are provided for large stock are of greater size than is necessary, I employ intermediate auxiliary partitions 31, located midway between the main partitions and connected at their front edges to a bar 32, which is recessed to receive the front edges of both the main and auxiliary partitions. To the upper edges of the auxiliary partitions are attached cross-pieces 33 to bear against the inner or facing surfaces of the main partitions, and the entire structure, including the auxiliary partitions, front connecting-bar 32, and spacing-pieces 33, is secured in place by means of screws 34, which pass through one of the longitudinal strips 12 at the rear side of the rack and engage the rear edges of the auxiliary partitions. It will be understood that any desired number of these intermediate or auxiliary partitions may be employed, but in the drawings I have illustrated two only, with space in the connecting-bar 32 for a third partition.

It is occasionally desirable to reduce the cross-sectional area of the feed-trough proper, as when shoats or small stock only are to be fed, and for this purpose I employ an auxiliary trough 35, having end pieces 36, which are equal in area to the cross-sectional area of the interior of the main trough, whereby, when the auxiliary trough is seated in the main trough, the upper edges of the sides of the former are in the plane of the upper edges of the latter, and this auxiliary trough is held in place in the main trough by means of the foot-lever 19, which spans the auxiliary trough and is secured to the sides of the main trough.

From the above description the operation of the device will be readily understood, and it is obvious that various changes in the form, proportion, and the minor details of construction may be resorted to without departing from the spirit or sacrificing any of the advantages of this invention.

Having described my invention, I claim—

1. The combination with a stationary supporting-frame and a trough arranged therein, of a rack pivoted between the end uprights of the frame and provided with a plurality of stalls formed by spaced partitions connected at their rear edges by longitudinal strips, said rack being capable of swinging movement to bring the rear edges of the partitions over the front edge of the trough, means for securing the rack in either its operative or inclined position, a stationary chute arranged at one end of the frame, and a distributing-trough secured to the rear side of the swinging rack and adapted to be arranged in alinement with the chute when the rack is in its inclined position, said distributing-trough being provided with a plurality of perforations to discharge water into the trough, substantially as specified.

2. The combination with a supporting-frame, of a swinging rack pivotally mounted in said frame, means for securing the rack in either its normal or inclined position, a feed-trough arranged below the plane of the rack, a distributing-trough carried by the rack and equal in length with the feed-trough, said distributing-trough having a continuous series of spaced outlet-openings, and a stationary chute supported by the frame and adapted to communicate with the distributing-trough when the rack is in its inclined position, substantially as specified.

3. The combination with a supporting-frame, of a feed-trough, a swinging rack pivotally mounted in the frame above the feed-trough and having a series of permanent spaced partitions forming main stalls, temporary or auxiliary partitions arranged in the intervals between the permanent partitions to divide the main stalls, spacing-pieces 33 secured to the upper edges of the temporary partitions and extending laterally from the plane thereof to bear at their extremities against the inner or facing surfaces of the permanent partitions, and a connecting-bar 32 permanently secured to the front edges of the temporary partitions and notched between the planes of the temporary partitions to receive the front edges of the permanent partitions, substantially as specified.

In testimony that I claim the foregoing as my own I have hereto affixed my signature in the presence of two witnesses.

GEORGE T. WINTERS.

Witnesses:
GEORGE H. CHAMBERS,
E. P. RICHARDSON.